(12) United States Patent
Miyazoe et al.

(10) Patent No.: US 8,567,443 B2
(45) Date of Patent: Oct. 29, 2013

(54) SPOOL-TYPE SELECTOR VALVE

(75) Inventors: Shinji Miyazoe, Tsukubamirai (JP); Kazuhiro Noguchi, Tsukubamirai (JP)

(73) Assignee: SMC Corporation, Tokyo (JP)

( * ) Notice: Subject to any disclaimer, the term of this patent is extended or adjusted under 35 U.S.C. 154(b) by 680 days.

(21) Appl. No.: 12/725,523

(22) Filed: Mar. 17, 2010

(65) Prior Publication Data
US 2010/0258210 A1    Oct. 14, 2010

(30) Foreign Application Priority Data

Apr. 13, 2009  (JP) ................................. 2009-097369

(51) Int. Cl.
*F16K 11/07*  (2006.01)
*F15B 13/04*  (2006.01)

(52) U.S. Cl.
USPC ................... 137/625.69; 137/625.64

(58) Field of Classification Search
USPC ........................................ 137/625.64, 625.69
See application file for complete search history.

(56) References Cited

U.S. PATENT DOCUMENTS

| | | | | |
|---|---|---|---|---|
| 1,123,273 A | * | 1/1915 | Gregersen | 137/625.69 |
| 2,307,585 A | * | 1/1943 | Harrington et al. | 137/625.69 |
| 3,768,376 A | * | 10/1973 | Orme | 137/625.69 |
| 3,909,017 A | * | 9/1975 | Engstrom | 277/586 |
| 3,951,166 A | * | 4/1976 | Whitener | 137/625.69 |
| 4,155,535 A | * | 5/1979 | Seamone | 137/625.69 |
| 4,548,223 A | * | 10/1985 | Kirkbride | 137/625.69 |
| 4,923,172 A | * | 5/1990 | Wood et al. | 137/625.69 |
| 5,513,674 A | * | 5/1996 | Frisch | 137/625.69 |
| 5,609,343 A | * | 3/1997 | Asou et al. | 137/625.69 |
| 5,971,022 A | * | 10/1999 | Hayashi et al. | 137/625.69 |
| 5,988,591 A | * | 11/1999 | Akimoto et al. | 137/625.69 |
| 6,966,340 B2 | * | 11/2005 | Lee | 137/625.69 |
| 8,176,939 B2 | * | 5/2012 | Yoshimura | 137/625.69 |

FOREIGN PATENT DOCUMENTS

| | | |
|---|---|---|
| CN | 201202846 Y | 3/2009 |
| JP | 62-194255 U | 12/1987 |
| JP | 2-20539 | 6/1990 |
| WO | WO 2008/051212 A1 * | 5/2008 |

OTHER PUBLICATIONS

Office Action issued Sep. 5, 2011, in Chinese Patent Application No. 201010163832.7 with English translation.

* cited by examiner

*Primary Examiner* — John Rivell
(74) *Attorney, Agent, or Firm* — Oblon, Spivak, McClelland, Maier & Neustadt, L.L.P.

(57) ABSTRACT

A tapered face whose hole diameter is gradually reduced toward a riding-on direction is formed at a valve-seat end of a supply valve seat or an discharge valve seat where a seal member of a spool slides and rides onto from a side with a low fluid pressure to a side with a high fluid pressure, while the other valve-seat end is kept as a cylindrical surface with a constant hole diameter, by which two tapered faces are formed in a valve hole, and an inner diameter of a portion located between the two tapered faces of the valve hole is formed equal to an inner diameter of a small diameter end of the tapered face, while an inner diameter of a portion located on a hole end side rather than the two tapered faces of the valve hole is formed equal to or larger than the inner diameter of a large diameter end of the tapered face.

6 Claims, 7 Drawing Sheets

SPOOL-TYPE SELECTOR VALVE

BACKGROUND OF THE INVENTION

1. Field of the Invention

The present invention relates to a spool-type selector valve configured such that a spool provided with a seal member made up of an elastic body slides in a valve hole of a valve body for switching a channel.

2. Description of the Related Art

Japanese Examined Utility Model Registration Application Publication No. 2-20539, which is Patent Document, describes a 5-port selector valve configured such that in a valve hole of a valve body provided with a supply channel communicating with the valve hole, output channels communicating with both sides thereof, and discharge channels communicating with a valve-hole end side of the output channels, a spool provided with an annular seal member made up of an elastic body is slidably fitted for switching a flow of a fluid by sliding of the spool. In the 5-port selector valve, the seal member is configured to ride onto a valve seat between the supply channel (input port) and the output channel (output port) in the valve hole from the output channel side, and a tapered face is formed at an end portion on the output channel side of the valve seat in relation with a bending angle of the seal member. Also, the seal member is configured to ride onto the valve seat between the output channel (output port) and the discharge channel (discharge port) from the output channel side, and a tapered face is formed at an end portion on the output channel side of the valve seat.

In the valve body provided with the above valve hole, since the tapered faces onto which the seal member rides are formed on both sides of the pair of the output channels, it takes labor to machine the valve hole in the valve body. That is, the tapered face needs to be machined by inserting a tool into the both side portions of the output channel inside the valve hole through an end portion of the valve hole, which requires skills and time for the machining and causes a rise in a manufacturing cost.

However, if the tapered face can be formed such that a diameter of the valve hole is gradually increased as it goes from the center part to the both end sides, riding onto the valve seat by the seal member is smoothened by the tapered face and at the same time, moldability and workability of the valve body are improved.

BRIEF SUMMARY OF THE INVENTION

Technical problems to be solved by the present invention are to smooth riding of a seal member onto a valve seat in a valve hole by a seal member of a spool in the above-mentioned selector valve and to improve moldability and workability of the valve body.

In order to solve the above problems, according to the present invention, in a spool-type selector valve for switching channels between a supply channel and two output channels as well as two discharge channels communicating with a valve hole by bringing close/separating a seal member on an outer periphery of a spool sliding in the valve hole to/from supply valve seats and discharge valve seats, a tapered face whose hole diameter is gradually reduced toward a direction of riding-on of the seal member is formed at a valve-seat end on which the seal member slides and rides from a side with a low fluid pressure to a side with a high fluid pressure in the valve-seat ends on both sides in an axial direction in each of the supply valve seats and the discharge valve seats, the valve seat end other than the valve-seat end where the tapered face is formed is kept as a cylindrical face with a constant hole diameter, by which two tapered faces whose small diameter sides are directed to a communication direction between the valve hole and the supply channel are formed on the valve hole, and an inner diameter of a portion located between the two tapered faces of the valve hole is formed equal to the inner diameter of a small-diameter end of the tapered face, while an inner diameter of a portion located on a hole end side rather than the two tapered faces of the valve hole is formed equal to or larger than the inner diameter of a large-diameter end of the tapered face.

In the present invention, the two tapered faces are preferably formed symmetrically to the axial direction of the valve hole, and the valve hole and the spool are also formed symmetrically to the axial direction.

Also, an inclination angle $\theta$ formed by the tapered face and the axis of the valve hole is preferably 10°-40°.

According to an aspect of the present invention, the tapered faces are formed at the valve-seat ends where the two discharge valve seats communicate with the two discharge channels, respectively, a plurality of the seal members of the spool are first and second seal members riding onto the two supply valve seats from the supply channel side and third and fourth seal members riding onto the two discharge valve seats from the discharge channel side, and a portion located between the two tapered faces of the valve hole is the two supply valve seats and the two discharge valve seats, and moreover, portions located on the hole end side rather than the two tapered faces of the valve hole are the seal cylindrical portions.

Also, according to another aspect of the present invention, the tapered faces are formed at the valve-seat ends where the two supply valve seats communicate with the two output channels, respectively, a plurality of seal members of the spool are first and second seal members riding onto the two supply valve seats from the supply channel side and third and fourth seal members riding onto the two discharge valve seats from the discharge channel side, and a portion located between the two tapered faces of the valve hole is the two supply valve seats, and moreover, portions located on the hole end side rather than the two tapered faces of the valve hole are the two discharge valve seats and the seal cylindrical portion.

According to the spool-type selector valve of the present invention described in detail as above, since a tapered face whose diameter is reduced toward its riding-on direction is formed at an end portion of a valve seat on which a seal member slides and rides from a side with a low fluid pressure to a side with a high fluid pressure, the tapered face applies a compressing force acting inward in the radial direction on the seal member flattened by the fluid pressure and thus, the seal member can ride onto the valve seat against the fluid pressure smoothly with this force.

Also, since the inner diameter of a portion on the hole end side rather than the tapered face in the valve hole is formed equal to or larger than the inner diameter of a large diameter portion of the tapered face, the inner diameter of the valve hole is equal to or is increased as it goes from the center part to the both end sides and at least not to be reduced, and moldability and workability of the valve body are improved.

DETAILED DESCRIPTION OF THE INVENTION

Figure 1:
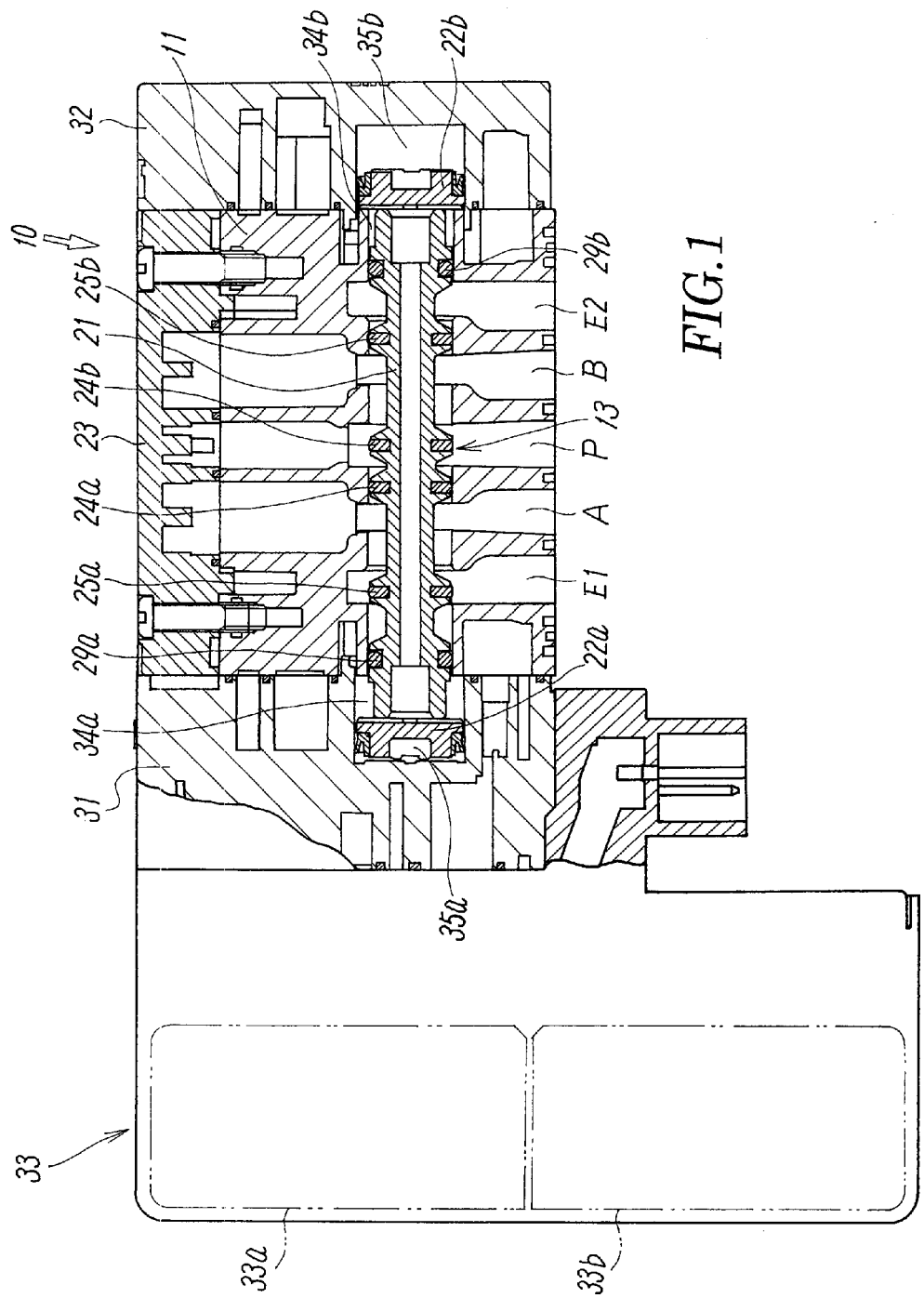
FIG. 1 is a longitudinal sectional view of an essential part illustrating an entire configuration of a first embodiment of spool-type selector valve according to the present; invention.
Figure 2:
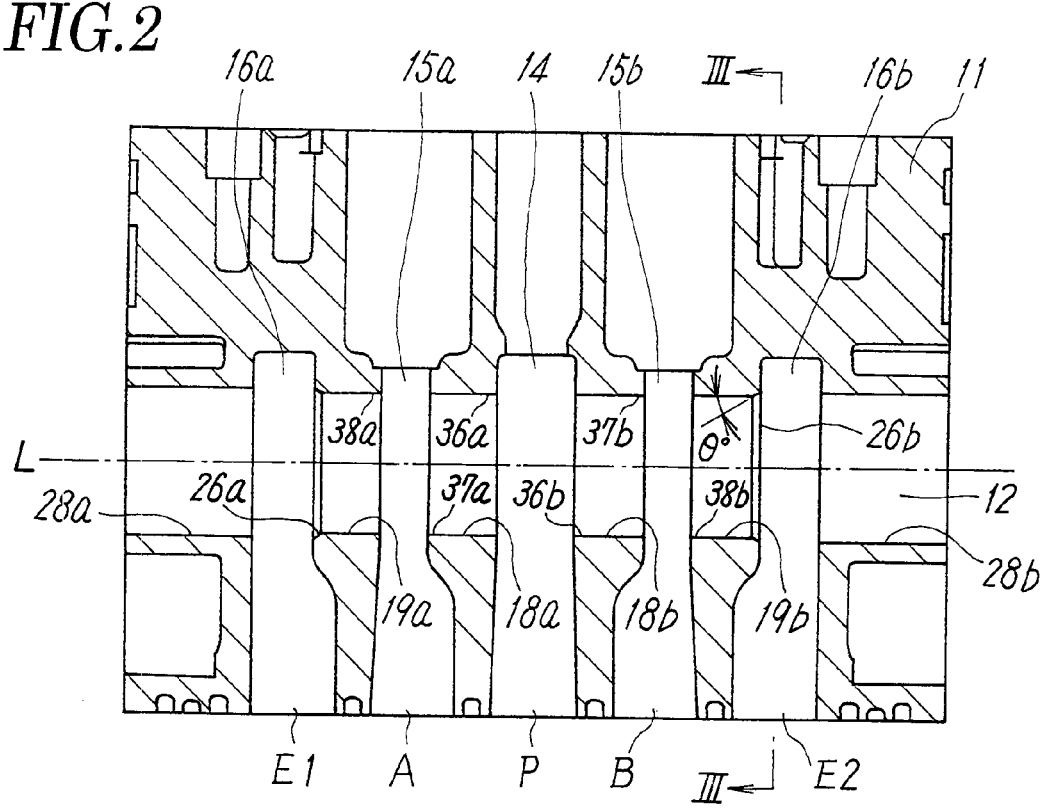
FIG. 2 is an enlarged longitudinal sectional view of a valve body in the selector valve of the first embodiment.
Figure 3:
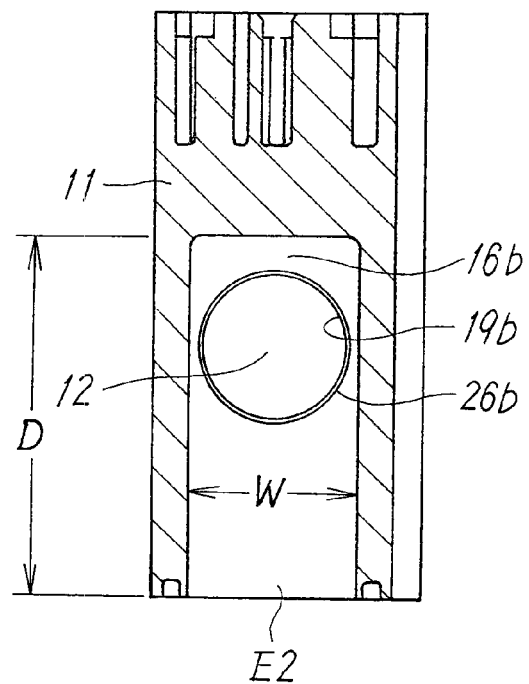
FIG. 3 is a sectional view at III-III position in FIG. 2.
Figure 4:
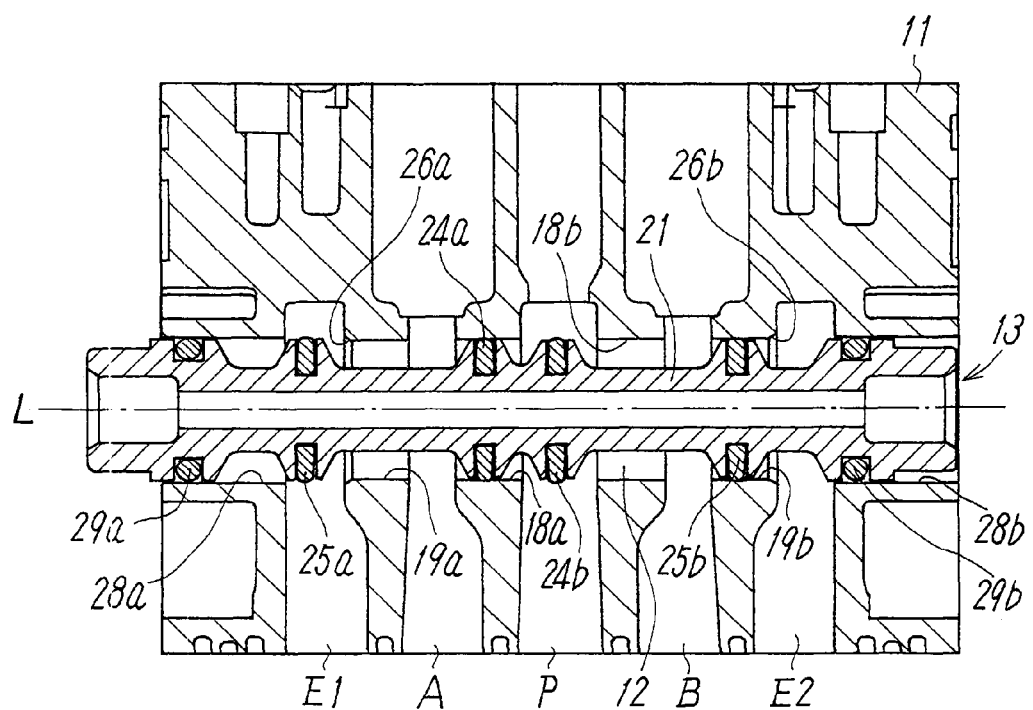
FIG. 4 is an enlarged sectional view illustrating a relationship between the valve body and a spool in the selector valve of the first embodiment.

FIG. 1 shows an entire configuration of a first embodiment of a spool-type selector valve 10 according to the present invention, FIGS. 2 and 3 show details of a valve body 11 of the selector valve 10 thereof, and FIG. 4 shows details of a state in which a spool 13 is inserted into a valve hole 12 of the valve body 11 in the selector valve 10.

The selector valve 10 has the valve body 11, the circular valve hole 12 penetrating the body 11, and the spool 13 fitted in the valve hole 12 slidable in an axis L direction of the valve hole, and the spool 13 is configured such that when the spool 13 is driven by a fluid-pressure operating force acting on one of first and second pistons 22a and 22b in contact with both end portions, the spool 13 slides to either of two selected positions of a left side end and a right side end in the valve hole 12.

The valve body 11 is provided with a supply channel P communicating with the valve hole 12 at the center part in the axis L direction, first and second two output channels A and B communicating with the valve hole 12 on both sides of the supply passage P, and first and second two discharge channels E1 and E2 communicating with the valve hole 12 at positions close to the hole end rather than the output channels A and B. As clearly shown in FIGS. 2 to 4, each of the channels has the valve hole 12 communicate with an outer face of the valve body 11 while the valve hole 12 is completely contained in its width W and depth D (See FIG. 3), by which enlarged grooves 14, 15a, 15b, 16a, and 16 are formed around the valve hole 12.

Also, in the inner periphery of the valve hole 12, first and second supply valve seats 18a and 18b having cylindrical surfaces are formed on portions between the supply passage P and the first and second output channels A and B, while first and second discharge valve seats 19a and 19b having cylindrical surfaces are formed on portions between the first and second output channels A and B and the first and second discharge channels E1 and E2.

On the other hand, the spool 13 is configured by fitting seal members 24a, 24b, and 25a, 25b made up of annular elastic bodies brought close to/separated from each of the valve seats in the grooves disposed in the outer periphery of a spool shaft 21 as shown clearly in FIG. 4. Specifically, the spool 13 is provided with the first and second seal members 24a and 24b brought close to/separated from the first and second supply valve seats 18a and 18b and the third and fourth seal members 25a and 25b brought close to/separated from the first and second discharge valve seats 19a and 19b, and the channels are switched by these seal members so that the supply channel P communicates with the output channel A or B and the output channel B or A communicates with the discharge channel E2 or E1.

FIG. 4 shows a state in which the spool 13 is located at the left end of the valve hole 12. In the case of switching of the channel from this state, referring also to FIG. 1, the spool 13 is pressed and driven by a pilot fluid pressure acting on the first piston 22a and moved to the right end of the valve hole 12. Also, in the case of switching of the channel from the state in which the spool 13 is located at the right end of the valve hole 12, the spool 13 is pressed and driven by the pilot fluid pressure acting on the second piston 22b and moved to the left end of the valve hole 12.

When the spool 13 is operated as above, as known from FIG. 4, the first and second seal members 24a and 24b ride onto the first and second supply valve seats 18a and 18b from the supply channel P side, respectively, while the third and fourth seal members 25a and 25b ride onto the first and second discharge valve seats 19a and 19b from the discharge channels E1 and E2 side, respectively.

Then, in the discharge valve seats 19a and 19b among the supply valve seats 18a and 18b and the discharge valve seats 19a and 19b, tapered faces 26a and 26b with conical faces whose hole diameters are gradually reduced toward the riding-on direction of the seal member are formed at the valve-seat ends on the side where the third and fourth seal members 25a and 25b ride onto, that is, at the valve-seat ends on the riding-on side. As a result, the seal members 25a and 25b slide in the valve hole 12 against a fluid pressure from the discharge channels E1 and E2 side with a low fluid pressure to the output channel A and B side with a high fluid pressure and ride onto the discharge valve seats 19a and 19b from the positions of the tapered faces 26a and 26b.

In the initial stage of riding of the seal members 25a and 25b onto the discharge valve seats 19a and 19b, the fluid pressure of the output channel A or B acts on the seal members 25a and 25b made up of an elastic body so as to press and flatten the seal members in the axial direction (matching the axis L of the valve hole) of the spool 13. However, since a force to compress the seal members inward in the radial direction acts on the seal members 25a and 25b by the tapered faces 26a and 26b at the same time, the seal members 25a and 25b are smoothly compressed and moved onto the discharge valve seats 19a and 19b, and the output channels A and B are shut off from the discharge channels E1 and E2.

On the valve-seat ends opposite the tapered faces 26a and 26b in the discharge valve seats 19a and 19b, that is, on open-side valve seat-ends 38a and 38b, a tapered face as mentioned above is not formed. That is, the open-side valve-seat ends 38a and 38b communicate with the output channels A and B with the cylindrical surfaces with a constant hole diameter and continue to side walls of the output channels A and B at a right angle.

On the other hand, in the supply valve seats 18a and 18b, riding-on side valve-seat ends 36a and 36b on the side where the first and second seal members 24a and 24b ride onto do not have a tapered face as mentioned above but are formed with cylindrical surfaces with a constant hole diameter. That is, the riding-on side valve-seat ends 36a and 36b communicate with the supply channel P with the cylindrical surfaces with a constant hole diameter. Also, open-side valve-seat ends 37a and 37b opposite the riding-on side valve-seat ends 36a and 36b of the supply valve seats 18a and 18b also communicate with the output channels A and B with cylindrical surfaces with a constant hole diameter.

With this configuration, the seal members 24a and 24b are pressed by the fluid pressure from the supply channel P side with a high fluid pressure to the output channel A and B side with a low fluid pressure and slide in the valve hole 12 and ride onto the supply valve seats 18a and 18b from the riding-on side valve-seat ends 36a and 36b where a tapered face is not formed.

In this case, since the seal members 24a and 24b are pressed by the supply fluid pressure of the supply channel P and pushed into the supply valve seats 18a and 18b, the supply fluid pressure effectively acts in riding onto the valve seat as a force to reduce diameters of the seal members 24a and 24b. Therefore, without means for aiding riding-on such as the above-mentioned tapered face, the seal members 24a and 24b can smoothly ride on the supply valve seats 18a and 18b.

Also, portions located on the hole end side rather than the tapered faces 26a and 26b in the valve hole 12 are seal cylindrical portions 28a and 28b, and the inner diameters of the seal cylindrical portions 28a and 28b are formed equal to or larger than the inner diameters at large diameter ends of the tapered faces 26a and 26b. On the other hand, a portion located between the two tapered faces 26a and 26b of the valve hole 12 are the supply valve seats 18a and 18b as well as the discharge valve seats 19a and 19b, and the inner diameters of the supply valve seats 18a and 18b as well as the discharge valve seats 19a and 19b are formed equal to the inner diameter at small diameter ends of the tapered faces 26a and 26b.

An inclination angle θ formed by the tapered faces 26a and 26b and the axis L of the valve hole 12 is 10°-40° in general, and thus, a length of a component in the axis L direction in the tapered faces 26a and 26b is longer than a length of a component crossing the axis L (radial component). When the seal members 25a and 25b ride onto the tapered faces 26a and 26b, the seal members ride onto the valve seats while being compressed inward in the radial direction along the tapered faces 26a and 26b, a diameter difference between the large diameter side and the small diameter side of the tapered faces 26a and 26b substantially corresponds to a compression margin of the seal member, and the inclination angle θ and the length of the taper portion in the axial direction need to be determined considering this point. In FIG. 2, since an inner face of the valve hole 12 is in parallel with the axis L, the inclination angle θ is shown as an angle formed by the inner face of the valve hole 12 and the tapered face 26b.

As known from FIG. 4, the seal cylindrical portions 28a and 28b are formed at both end portions of the valve hole 12 in the valve body 11 for stable sliding of the spool 13, and end seals 29a and 29b made of O-rings disposed at both end portions of the spool 13 are brought into sliding contact with the inner faces of the cylindrical portions 28a and 28b.

The two tapered faces 26a and 26b are formed symmetrically to the axis L direction of the valve hole 12, and similarly, the valve hole 12 and the spool 13 are formed symmetrically to the axis L direction.

As mentioned above, the two tapered faces 26a and 26b formed on the valve hole 12 have their small diameter sides inclined toward the hole depth side of the valve hole 12, that is, toward the side communicating with the supply channel P, and the inner diameter of portions located on the hole end side rather than the tapered faces 26a and 26b in the valve hole 12, that is, the inner diameter of the seal cylindrical portions 28a and 28b is formed equal to or larger than the inner diameter of the large diameter end of the tapered faces 26a and 26b. Thus, the inner diameter of the valve hole 12 is kept equal or is increased from the center part of the valve hole 12 toward the both end sides and is at least not to be decreased. Therefore, moldability and workability of the valve body 11 can be improved, and demolding of the valve hole in die casting by an aluminum material or injection molding by synthetic resin or machining such as polishing of the valve seat and the tapered face and the like can be performed easily.

An adapter plate 31 and an end cover 32 are mounted at both ends of the valve body 11 in the axis L direction, and a known double-pilot electromagnetic valve 33 for switching and driving the spool 13 is fixed to the adapter plate 31.

The adapter plate 31 and the end cover 32 are provided with piston chambers 34a and 34b located at both end portions of the valve hole 12, and the pistons 22a and 22b to be brought into contact with the end portions of the spool 13 are contained in the respective piston chambers. Also, output ports of pilot valves 33a and 33b in the double-pilot electromagnetic valve 33 communicate with pressure chambers 35a and 35b formed behind the pistons 22a and 22b through a flow channel, not shown. And it is so configured that the spool 13 can be switched and driven through the pistons 22a and 22b by supplying a pilot fluid pressure from the pilot valves 33a and 33b to either of the pressure chambers 35a or 35b and by ejecting the fluid pressure of the other pressure chamber 35b or 35a to the outside.

Figure 7:
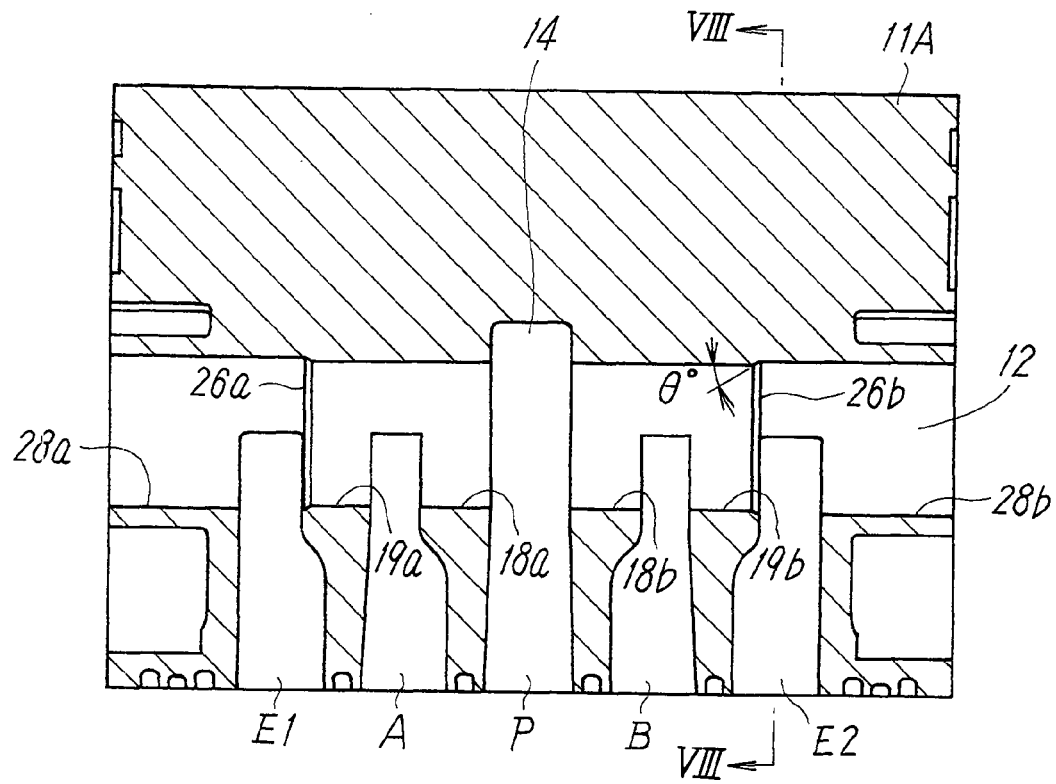
FIG. 7 is a longitudinal sectional view of a valve body in a variation of a spool-type selector valve according to the present invention.
Figure 8:
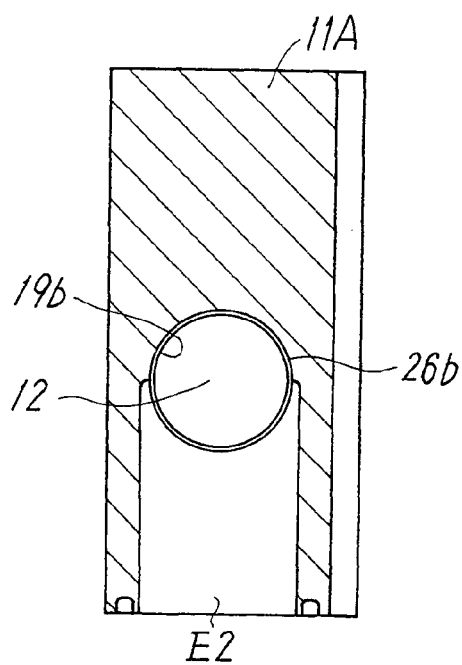
FIG. 8 is a sectional view at VIII-VIII position in FIG. 7.

The valve body 11 shown in FIGS. 1 to 4 have the supply channel P and the output channels A and B extending in the vertical direction of the valve body 11 so that a pipeline can be connected to a desired upper or lower side, and FIG. 1 shows a state in which the upper channel is closed by a cover 23. However, as a valve body in a variation shown in FIGS. 7 and 8, a valve body 11A can be configured as the one without the supply channel and the output channel on the upper side. Since the valve body 11A shown in FIGS. 7 and 8 is not different from the one in the first embodiment except the above-mentioned points, the same reference numerals as those in the first embodiment are given to major portions and the description will be omitted.

Figure 5:
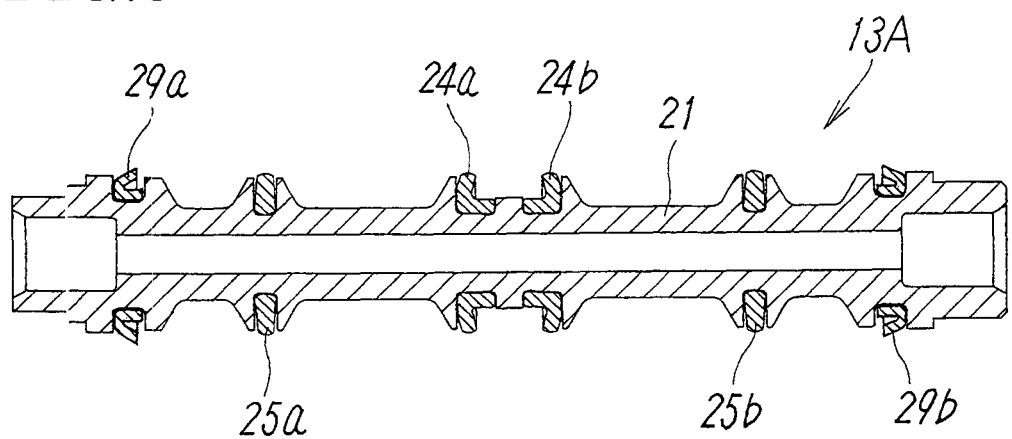
FIG. 5 is an enlarged sectional view illustrating a variation of the spool in the selector valve of the first embodiment.
Figure 6:
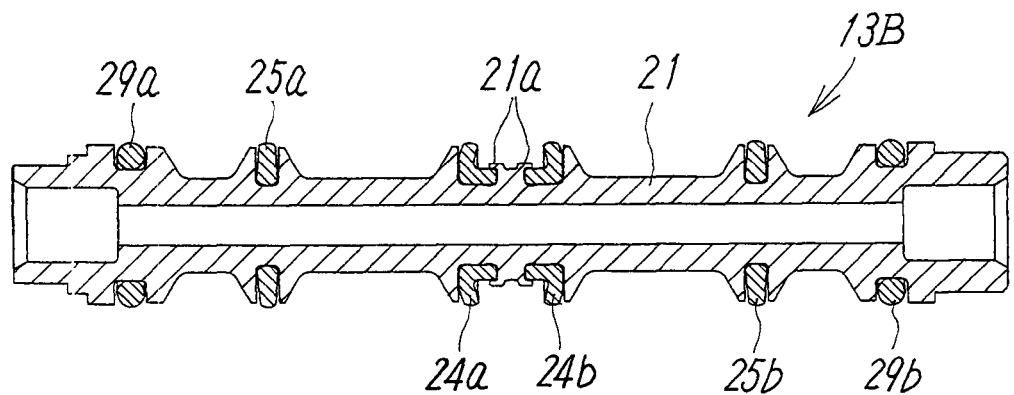
FIG. 6 is an enlarged sectional view illustrating another variation of the spool in the selector valve of the first embodiment.

Spools 13A and 13B shown in FIGS. 5 and 6 can be used instead of the spool 13 shown in FIGS. 1 and 4.

In the spool 13 in FIGS. 1 and 4, all the first and second seal members 24a and 24b and the third and fourth seal members 25a and 25b are formed with the width in the radial direction approximately twice larger than the thickness of the spool shaft 21 in the axial direction, but in the spool 13A in FIG. 5, the first and second seal members 24a and 24b are formed with sections in the L-shape and their lip portions rising in the radial direction ride on the supply valve seats 18a and 18b, while the third and fourth seal members 25a and 25b are formed in the same shape as those in FIG. 4. Moreover, in the spool 13A in FIG. 5, the end seals 29a and 29b are formed with V-shaped sections.

Also, in the spool 13B in FIG. 6, the first and second seal members 24a and 24b have the same L-shaped sections as in FIG. 5, but portions of the seal members 24a and 24b along the spool shaft 21 are held by the spool shaft 21 by caulking a projecting wall 21a on the outer periphery of the spool shaft 21. The third and fourth seal members 25a and 25b and the end seals 29a and 29b in this spool 13B are in the same shape as those in FIG. 4.

As mentioned above, the seal members mounted on the spools 13, 13A, and 13B are partially different in the form, but a function of the seal members in relation with the supply valve seats 18a, 18b, 19a, and 19b and the tapered faces 26a and 26b is not different from the description made in relation with the spool 13 in FIG. 4.

Subsequently, an operation of the first embodiment will be described.

In a switched state shown in FIGS. 1 and 4, since the spool 13 is located at the left-end position, the second and third seal members 24b and 25a are located in the enlarged groove 14 communicating with the supply channel P and the enlarged groove 16a communicating with the first discharge channel E1 and not in contact with the second supply valve seat 18b and the first discharge valve seat 19a.

On the other hand, the first seal member 24a rides onto the first supply valve seat 18a between the supply channel P and the first output channel A, while the third seal member 25b rides onto the second discharge valve seat 19b between the second output channel B and the second discharge channel E2. Thus, the pressure fluid from the supply channel P passes through the inside of the second supply valve seat 18b and flows to the second output channel B, while the pressure fluid of the first output channel A passes through the inside of the first discharge valve seat 19a and is ejected to the first discharge channel E1.

When the channel is to be switched by driving the spool 13 from the above-mentioned switched state, in FIG. 1, the pilot fluid pressure is supplied to the pressure chamber 35a behind the first piston 22a by the pilot valves 33a and 33b of the electromagnetic valve 33, and the pilot fluid pressure having been supplied to the pressure chamber 35b behind the second piston 22b is ejected. As a result, the spool 13 is driven by the first piston 22a and moved to the switching position at the right end of the valve hole 12.

By means of this movement, the first and fourth seal members 24a and 25b are located in the enlarged groove 14 communicating with the supply channel P and in the enlarged groove 16b communicating with the second discharge channel E2 and take the positions not in contact with the first supply valve seat 18a and the second discharge valve seat 19b. Also, the second seal member 24b rides onto the second supply valve seat 18b between the supply channel P and the second output channel B, while the third seal member 25a take the position riding onto the first discharge valve seat 19a between the first output channel A and the first discharge channel E1. As a result, the pressure fluid from the supply channel P passes through the inside of the first supply valve seat 18a and flows to the first output channel A, while the pressure fluid of the second output channel B passes through the inside of the second discharge valve seat 19b and is ejected to the second discharge channel E2.

When the spool 13 is to be driven to the switched position at the left end in FIG. 1 again, it is only necessary to invert the supply and discharge relationship of the pilot fluid pressure with respect to the first and second pistons 22a and 22b.

In the above-mentioned switching and driving of the spool 13, the third and fourth seal members 25a and 25b ride onto the discharge valve seats 19a and 19b against the fluid pressure from the output channels A and B, but due to presence of the tapered faces 26a and 26b at the valve-seat end on the riding-on side of the discharge valve seat, the seal members 25a and 25b are compressed by the tapered faces 26a and 26b inward in the radial direction. As a result, the seal members 25a and 26b smoothly reduce their diameters, move onto the valve seats 19a and 19b, and shut off the communication state between the output channels A and B and the discharge channels E1 and E2.

On the other hand, the first and second seal members 24a and 24b are pushed from behind by the fluid pressure from the supply channel P and ride onto the supply valve seats 18a and 18b. In this case, though there is no tapered face such as mentioned above at the valve-seat ends 36a and 36b on the riding-on side of the supply valve seat, the supply fluid pressure effectively acts on the riding-on of the seal members 24a and 24b onto the supply valve seats, and smooth riding-on is performed.

Figure 9:
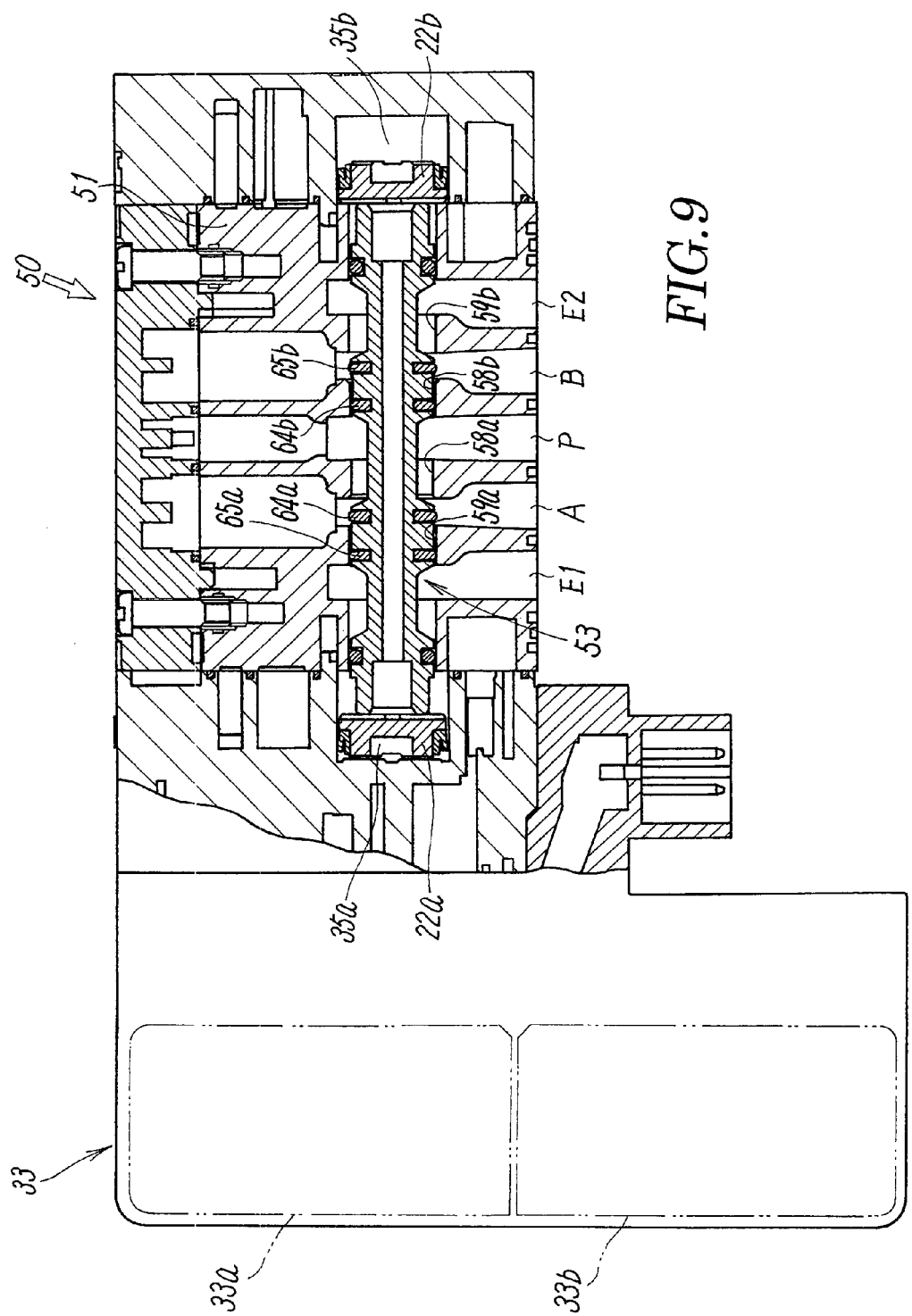
FIG. 9 is a longitudinal sectional view of an essential part illustrating an entire configuration of a second embodiment of a spool-type selector valve according to the present invention.
Figure 10:
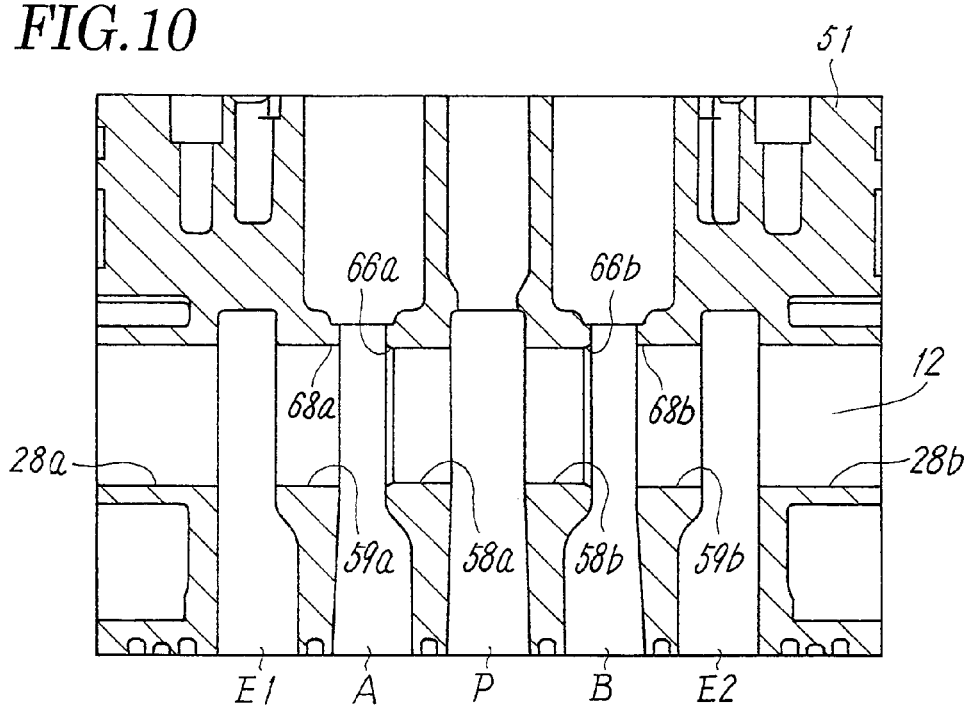
FIG. 10 is an enlarged longitudinal sectional view of a valve body in the selector valve of the second embodiment.
Figure 11:
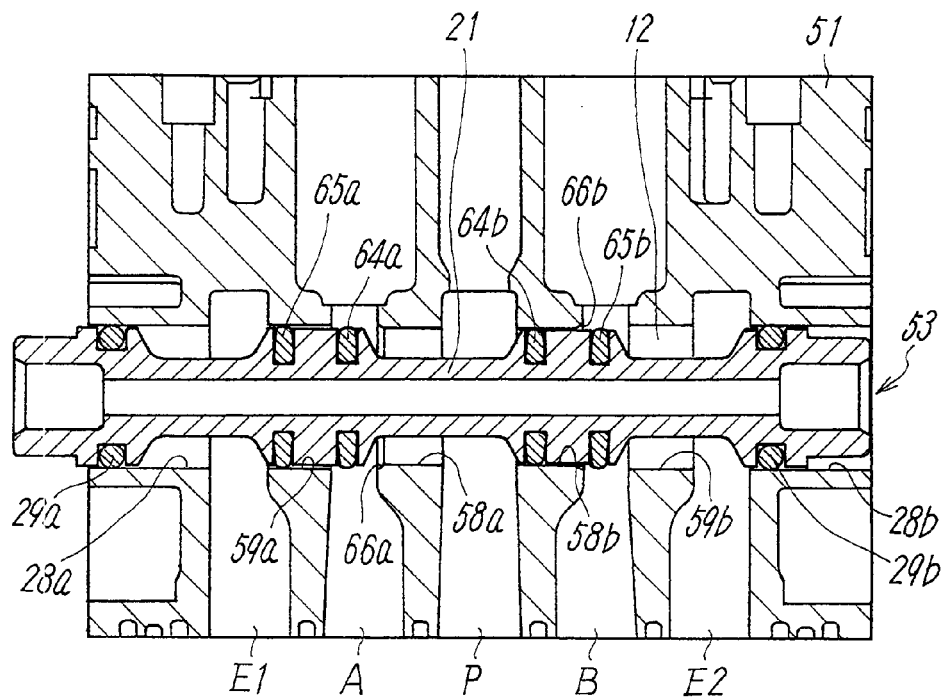
FIG. 11 is an enlarged sectional view illustrating a relationship between the valve body and a spool in the selector valve of the second embodiment.

FIGS. 9 to 11 show a configuration of a spool-type selector valve 50 of a second embodiment according to the present invention. A valve body 51 of the selector valve 50 of the second embodiment has a position to provide a tapered face in a valve hole different from that of the valve body 11 of the selector valve 10 in the first embodiment, but there is no difference in the other points. Also, the spool 53 in the second embodiment has an installation position of the seal member and a riding-on mode onto the valve seat different from those of the spool 13 in the first embodiment, but there is no difference in the other points.

Therefore, in the following, only the differences from the first embodiment will be mainly described, the same reference numerals as those in the first embodiment are given to common portions in the figure, and the description will be omitted.

As clearly shown in FIGS. 10 and 11, in the valve body 51, the supply channel P, the first and second output channels A and B, the first and second discharge channels E1 and E2, first and second supply valve seats 58a and 58b, and first and second discharge valve seats 59a and 59b are disposed.

On the other hand, the spool 53 is provided with annular first and second seal members 64a and 64b brought close to/separated from the first and second supply valve seats 58a and 58b and annular third and fourth seal members 65a and 65b brought close to/separated from the first and second discharge valve seats 59a and 59b, and it is so configured that the first and second seal members 64a and 64b ride onto the first and second supply valve seats 58a and 58b from the output channels A and B side, respectively, and the third and fourth seal members 65a and 65b also ride onto the first and second discharge valve seats 59a and 59b from the output channels A and B side, respectively.

Then, in the supply valve seats 58a and 58b among the supply valve seats 58a and 58b and the discharge valve seats 59a and 59b, tapered faces 66a and 66b whose hole diameters are gradually reduced toward the riding-on direction of the seal member are formed at the valve-seat ends on the side where the first and second seal members 64a and 64b ride onto, that is, at valve-seat ends on the riding-on side. As a result, the seal members 64a and 64b slide in the valve hole 12 against the fluid pressure from the output channels A and B side with a low fluid pressure to the supply channel P side with a high fluid pressure and ride onto the supply valve seats 58a and 58b from the positions of the tapered faces 66a and 66b.

The valve-seat ends opposite the tapered faces 66a and 66b of the supply valve seats 58a and 58b, that is, the open-side valve-seat ends communicate with the supply channel P with the cylindrical surface with a constant hole diameter.

On the other hand, in the discharge valve seats 59a and 59b, the riding-on side valve-seat ends 68a and 68b on the side where the third and fourth seal members 65a and 65b ride onto do not form the above-mentioned tapered faces but are formed as cylindrical surfaces with constant hole diameters. That is, the riding-on side valve-seat ends 68a and 68b communicate with the output channels A and B with the cylindrical surfaces with constant hole diameters. The open-side valve-seat ends on the side opposite the riding-on side valve-seat ends 68a and 68b also communicate with the discharge channels E1 and E2 with the cylindrical surfaces with constant hole diameters.

The two tapered faces 66a and 66b formed in the valve hole 12 are formed with their small-diameter sides directed toward communicating portions between the valve hole 12 and the supply channel P, and an inner diameter of a portion located on both hole end sides rather than the tapered faces 66a and 66b in the valve hole 12, that is, the inner diameters of the discharge valve seats 59a and 59b and the seal cylindrical portions 28a and 28b are formed equal to or larger than the inner diameters at the large diameter ends of the tapered faces 66a and 66b, and the inner diameter of a portion located between the tapered faces 66a and 66b of the valve hole 12, that is, the inner diameters of the supply valve seats 58a and 58b are formed equal to the inner diameters of the small diameter ends of the tapered faces 66a and 66b. The inclination angle θ formed by the tapered faces 66a and 66b and the axis of the valve hole 12 is set at 10°-40° in general similarly to the first embodiment.

Moreover, an operation of the spool-type selector valve 50 in the second embodiment is different only in the direction where the seal member rides onto the valve seat and its channel switching function is not different at all.

The invention claimed is:

1. A spool-type selector valve comprising:
   a valve body;
   a valve hole formed in the valve body along a longitudinal axis;
   a supply channel communicating with the valve hole;
   two output channels communicating with the valve hole on both sides of the supply channel;
   two discharge channels communicating with the valve hole at positions of the valve hole on exterior sides of the two output channels and away from the supply channel along the longitudinal axis;
   two supply valve seats, each of the two supply valve seats including cylindrical surfaces formed respectively in the valve hole between one of the two output channels and the supply channel;
   two discharge valve seats, each of the two discharge valve seats including cylindrical surfaces formed respectively in the valve hole between one of the two output channels with one of the two discharge channels;
   two seal cylindrical portions formed respectively in the valve hole at positions on exterior sides of the two discharge channels and away from the supply channel along the longitudinal axis; and
   a spool slidably fitted in the valve hole, the spool including a plurality of seal members made up of an elastic body for switching a channel by riding onto or separating from each of the supply valve seats and each of the discharge valve seats, and an end seal made up of an elastic body brought into sliding contact with the seal cylindrical portion,
   wherein each of the supply valve seats and each of the discharge valve seats include an interior valve-seat end and an exterior valve-seat end along the longitudinal axis with respect to the supply channel,
   wherein each of the exterior valve-seat ends of the supply valve seats out of the supply valve seats and the discharge valve seats includes a tapered face with an inner diameter gradually decreasing towards a riding-onto direction where one of the plurality of seal members slides from a low fluid pressure side to a high fluid pressure side,
   wherein each of the interior valve-seat ends of the supply valve seats includes a cylindrical surface with a constant hole diameter that is equal to a smallest diameter of the tapered face, and
   wherein each of the discharge valve seats has a diameter that is greater than or equal to a largest diameter of the tapered face.

2. The spool-type selector valve according to claim 1, wherein the two tapered faces are formed symmetrically along the longitudinal axis of the valve hole, and the valve hole and the spool are also formed symmetrically along the axis.

3. The spool-type selector valve according to claim 1, wherein an inclination angle θ formed by the tapered face and the longitudinal axis of the valve hole is 10°-40°.

4. A spool-type selector valve comprising:
   a valve body;
   a valve hole formed in the valve body along a longitudinal axis;
   a supply channel communicating with the valve hole;
   two output channels communicating with the valve hole on both sides of the supply channel;
   two discharge channels communicating with the valve hole at positions of the valve hole on exterior sides of the two output channels and away from the supply channel along the longitudinal axis;
   two supply valve seats, each of the two supply valve seats including cylindrical surfaces formed respectively in the valve hole between one of the two output channels and the supply channel;
   two discharge valve seats, each of the two discharge valve seats including cylindrical surfaces formed respectively in the valve hole between one of the two output channels with one of the two discharge channels;
   two seal cylindrical portions formed respectively in the valve hole at positions on exterior sides of the two discharge channels and away from the supply channel along the longitudinal axis; and
   a spool slidably fitted in the valve hole, the spool including a plurality of seal members made up of an elastic body for switching a channel by riding onto or separating from each of the supply valve seats and each of the discharge valve seats, and an end seal made up of an elastic body brought into sliding contact with the seal cylindrical portion,
   wherein each of the supply valve seats and each of the discharge valve seats include an interior valve-seat end and an exterior valve-seat end along the longitudinal axis with respect to the supply channel,
   wherein each of the exterior valve-seat ends of the discharge valve seats out of the supply valve seats and the discharge valve seats includes a tapered face with an inner diameter gradually decreasing towards a riding-onto direction where one of the plurality of seal members slides from a low fluid pressure side to a high fluid pressure side,
   wherein each of the interior valve-seat ends of the discharge valve seats and the supply valve seats includes a cylindrical surface with a constant hole diameter that is equal to a smallest diameter of the tapered face, and
   wherein each of the seal cylindrical portions has a diameter that is greater than or equal to a largest diameter of the tapered face.

5. The spool-type selector valve according to claim 4, wherein the two tapered faces are formed symmetrically along the longitudinal axis of the valve hole, and the valve hole and the spool are also formed symmetrically along the axis.

6. The spool-type selector valve according to claim 4, wherein an inclination angle θ formed by the tapered face and the longitudinal axis of the valve hole is 10°-40°.

* * * * *